Figure 1:
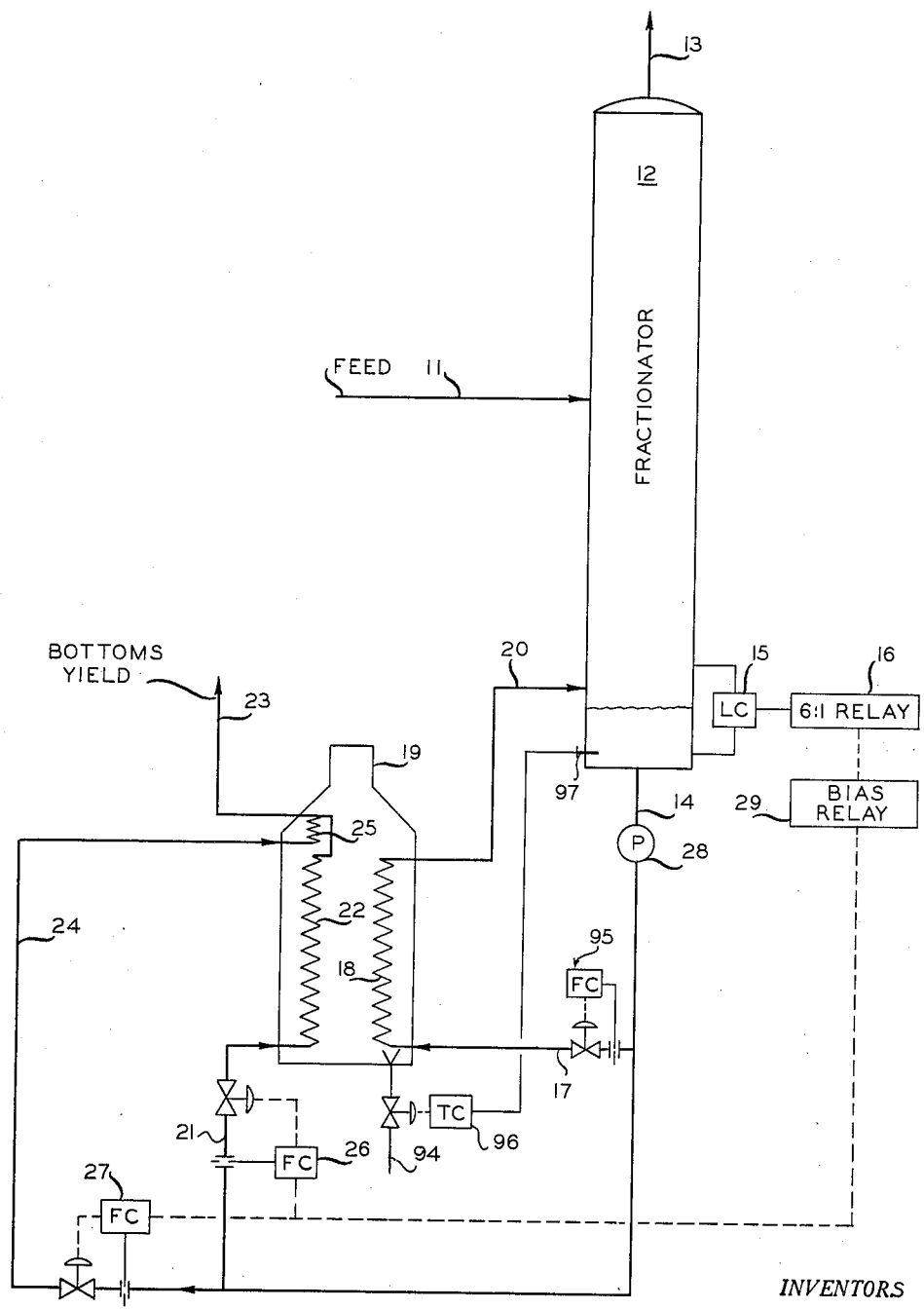

May 3, 1966 L. H. VAUTRAIN ETAL 3,249,518
FRACTIONATOR CONTROL
Filed Dec. 18, 1961 2 Sheets-Sheet 1

INVENTORS
L. H. VAUTRAIN
D. P. KEELER
BY *Young & Quigg*
ATTORNEYS

May 3, 1966     L. H. VAUTRAIN ETAL     3,249,518
FRACTIONATOR CONTROL
Filed Dec. 18, 1961     2 Sheets-Sheet 2

INVENTORS
L. H. VAUTRAIN
D. P. KEELER
BY
ATTORNEYS 3,249,518
FRACTIONATOR CONTROL
Lucien H. Vautrain and Donald P. Keeler, Okmulgee, Okla., assignors to Phillips Petroleum Company, a corporation of Delaware
Filed Dec. 18, 1961, Ser. No. 160,065
6 Claims. (Cl. 202—160)

This invention relates to a method and apparatus for fractional distillation tower control. In one aspect it relates to a method and apparatus for controlling withdrawal of kettle or bottoms product without over correcting the controls. In another aspect it relates to a method and apparatus for control of the operation of a fractional distillation column from which at least two sidestreams are withdrawn as products to make certain that there is always liquid reflux flowing down the column, particularly from the level of the lower of the two sidestream withdrawal points on down the column.

In many conventional fractional distillation towers there is only a relatively shallow layer or small volume of liquid reflux on any given tray in the tower. Considerable liquid level variation on the trays occurs, particularly on trays from which sidestream products are withdrawn. Liquid level variation causes standard cascade control using flow as a secondary and level as a primary control to be very erratic and irregular in operation. Also, on flow from a tower to a fired heater a low level could cause a dangerously low flow or, at times, no flow at all. The novelty of one embodiment of this invention is the employment of a fixed ratio relay plus a Moore M–F relay in the cascade control of flow of bottoms liquid to a fired heater. The ratio relay replaces a ratio controller frequently used in instrumentation flow control loops. The signal to the ratio relay is from a controller instead of from a transmitter as is sometimes used in such ratio cascade control. Since the signal from a 6:1 relay will be in the ½ to 2½ p.s.i. range, a bias must be added to bring this low pressure to a value within the 3 to 15 p.s.i. signal range for set point pressure control. This pressure increase is carried out by using a Moore M–F 68 relay which is furnished on some commercially available control instruments.

In fractional distillation towers employing as charge stock hot vapors originating from high temperature hydrocarbon cracking stills the tower bottoms make oil and heavy cycle type oils are of relatively little value and their yields are to be kept as low as possible. Ordinary operation of such towers withdraws these oils on level control thereby yielding these oils in larger volumes than absolutely necessary. According to another embodiment of this invention we withdraw heavy cycle oil and bottoms make oil from the fractional distillation tower on rate of flow control thereby producing only minimum volumes of these low value oils. In order to be able to withdraw these oils on predetermined flow control we operate the remainder of the fractional distillation column accordingly so that tower operation will be smooth and regular.

Since such fractional distillation towers operate on hot cracked vapors a portion of the tower bottoms product is passed to storage on rate of flow control and the remainder of the bottoms product flow is cooled in a waste heat exchanger and the so-cooled stream of bottoms liquid is reintroduced into the tower for condensation purposes to provide liquid in the lower portion of the tower and to cool the contents thereof to such a temperature that conventional top tower reflux provides the remainder of the cooling for proper tower operation. In this type of operation the tower temperature is controlled by flow control of liquid bottoms as low tower reflux through the waste heat exchanger cascaded by a level control through a reducing relay operating in such a manner as to minimize operational fluctuations. Furthermore, in order to assist in such tower control, a heavy cycle oil take-off tray well level control is connected through a reducing relay to cascade control and recycled to a product subsequent treatment flow recorder-controller. In order to make certain that the heavy cycle oil liquid level flow controller assembly does not remove so much of the heavy cycle oil as to reduce reflux downflow therefrom to too small a volume, we provide apparatus for reducing or closing off the light cycle oil take-off from an upper level of the tower in order to provide more downflow of reflux from the light cycle oil take-off tray to the heavy cycle take-off tray. In this manner excess oil is present on the heavy cycle oil take-off tray thereby providing for proper overflow of reflux liquid therefrom for use in lower portions of the tower. A proportioning relay in one case is used in throttling the rate of take-off of the light cycle oil or a snap-acting relay is used to completely close off the light cycle oil flow from the take-off tray in order to increase downflow of reflux therefrom.

An object of this invention is to provide method and apparatus for controlling withdrawal of kettle or bottom product liquid from a fractional distillation tower without over correcting the controls. In another aspect it relates to a method and apparatus for controlling the operation of a fractional distillation column from which at least two sidestreams are withdrawn as products to make certain that there is always liquid reflux flowing down the column. Other objects and advantages of this invention will be realized upon reading the following description which, taken with the attached drawing, forms a part of this specification.

Figure 2:
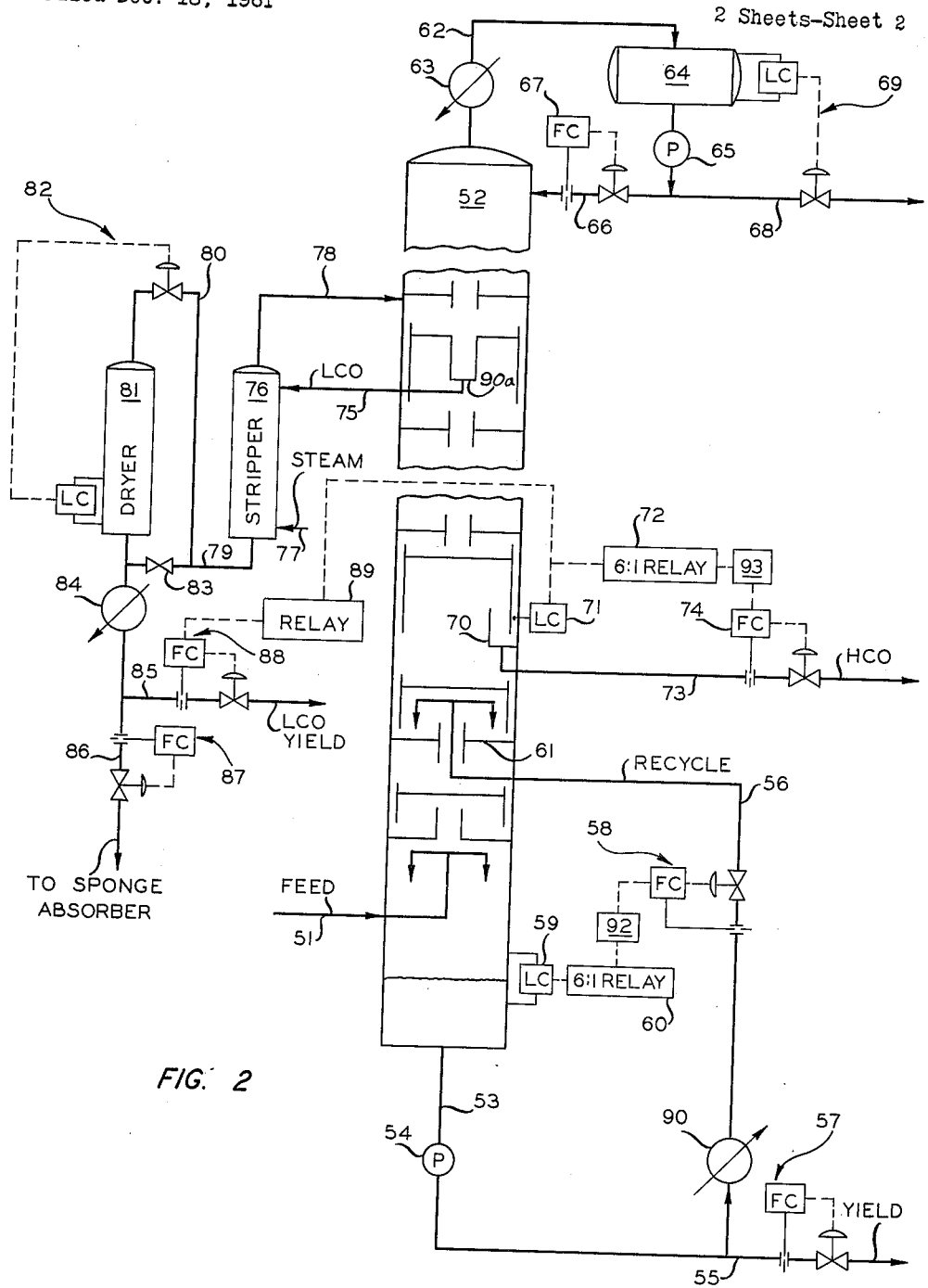

In the drawing FIGURE 1 illustrates, in diagrammatic form, an arrangement of apparatus parts for carrying out one embodiment of this invention. FIGURE 2 illustrates, in diagrammatic form, an arrangement of apparatus parts for carrying out a second embodiment of this invention.

Referring now to the drawing, and specifically to FIGURE 1, reference numeral 11 identifies a conduit through which a feed stock flows into a fractional distillation tower 12. This tower is provided with vapor-liquid contact promoting apparatus such as bubble cap trays, or the like, not shown. The tower is also provided with a conduit 13 and a conduit 14 for withdrawal of overhead vaporous and kettle products, respectively. A pump 28 is provided in conduit 14 for transferring bottoms product from fractionator tower 12 at a uniform rate. Conduit 14 downstream of pump 28 branches into two portions; one portion, conduit 17, passes recycle or reboiler liquid through a heater coil 18 and thence through conduit 20 back into the kettle section of the tower to provide reboiling heat. The other portion of the bottoms material passes through a conduit 21, a branch conduit 24 being provided as illustrated. Conduit 21 has the oil flow therein regulated by a flow controller 26 and from the flow controller 26 the oil passes through a coil 22 in heater 19 and thence through a conduit 23 to a point of disposal, not shown. Conduit 24 is provided with a rate of flow controller apparatus 27 and downstream of this controller conduit 24 connects with a short heater coil 25 which, in turn, connects with conduit 23. Heater coil 25 is positioned in the convection portion of the heater while coils 18 and 22 are positioned in the radiant section of the heater.

A level controller apparatus 15 is provided as illustrated for sensing and controlling level of the bottoms liquid in fractionator 12. The signal from the level controller 15 is passed directly to a reducing relay 16 which, in turn, emits a signal of reduced intensity which is conveyed directly to a bias relay 29. This reducing relay is illustrated in FIGURE 1 as being a 6:1 relay, that is, it emits a signal having one-sixth the intensity of the signal emitted from the level controller 15. Thus, any signal of any intensity emitted from level controller 15 is reduced to one-sixth of its intensity in the reducing relay 16. However, a reducing relay of any other desired reducing ratio can be used, for example, a 5:1 relay, 4:1 relay or even a 10:1 relay, as desired.

The bias relay 29 is employed for the specific purpose of emitting a signal of such intensity as to operate properly flow controllers 26 and 27. The following pressures of the signals emitted by the level controller 15, the reducing relay 16 and the bias relay 29 are given herein merely as examples of the operation of these pieces of equipment. If, for example, the level controller 15 emits pressure signals varying from, for example, 3 to 15 p.s.i. (pounds per square inch), then such signal is fed directly to the reducing relay 16. Since this relay reduces the pressure signal to one-sixth of its received signal, the signal emitted from the reducing relay then varies from ½ to 2½ p.s.i. Such low pressure is too low to operate properly conventional flow controller equipment such as flow controllers 26 and 27. Thus the bias relay then merely emits signals to a higher pressure level than the signals passed into the bias relay but having the same pressure range as the signals reaching the bias relay 29. For example, pressures of ½ to 2½ pounds are fed into the bias relay 29 and in this relay those pressures are increased by, for example, 10 p.s.i.; thus the pressure signals emitted from relay 29 then vary from 10½ to 12½ p.s.i. Such pressures are operable for actuation of flow controllers 26 and 27.

The actual temperatures imparted in heating coils 22 and 25 to the bottoms make product of the apparatus of FIGURE 1 play no part in this invention but the heater 19 also provides heat to heating coil 18 for reboiling tower 12. If the level of liquid in the kettle section of tower 12 rises to a level above a predetermined level, level controller 15 emits a signal which is reduced in reducing relay 16 in a definite ratio and this reduced signal then is increased in the bias relay 29 and the increased signal then resets the set points of flow controllers 26 and 27 so that these controllers further open the valves in conduits 21 and 24 thereby allowing more of the bottoms product from tower 12 to leave the tower as product. Accordingly, since pump 28 is a constant output pump, and since the reboiler fluid flowing through conduit 17 is on FRC or FC 95 the volume flowing through heater coil 18 is constant. The tower bottoms temperature sensed by thermocouple 97 is maintained constant by the TRC or TC 96 by changing the quantity of fuel gas flowing through conduit 94 to the reboiler coil burner.

In prior art operations in which a reducing relay such as relay 16 is not employed, the signal emitted from level controller 15, in many instances, actuates the set points of flow controllers 26 and 27 to an inordinately great extent thereby over-correcting the operation; the result is too great a volume of make oil is withdrawn from the system with the result that too much oil is removed from the kettle with over-correction of the level. Then, with the level too low, the level controller again resets the set points of controllers 26 and 27 thereby throttling these valves and allowing the level of liquid in the reboiler section of the tower to rise, under which condition in many instances the level rises too high. Such operation is frequently known as hunting.

By using such a relay as relay 16, coupled with use of the bias relay 29, this over-correction or hunting in such an operation is eliminated. Thus, the level of the liquid in the kettle section 12 is lowered, but not too rapidly, from a high level; and, likewise, if the level is too low, then it is increased at not too rapid a rate.

Fractional distillation tower 12 is obviously provided with an overhead condenser, accumulator, and reflux conduit for cooling the top of the tower, all this equipment being conventional and not shown herein since it actually plays no part in this invention.

In FIGURE 2 of the drawing a conduit 51 is provided for passage of a hot vaporous feed stock from a catalytic cracking reactor or a cracking still, not shown, into the lower portion of a fractional distillation column 52. A conduit 53 provided with a constant flow pump 54 passes kettle liquid from tower 52, with a portion being yielded to product or subsequent treatment through a conduit 55 while the remainder of the bottoms liquid is passed through a waste heat exchanger 90 with the cooled liquid thus passing through a conduit 56 back into tower 52 at a level somewhat above the level of the introduction of the hot vaporous feed. Conduit 55 is provided with a flow controller assembly 57 which is set to pass make bottoms product at a predetermined flow rate. This predetermined flow rate is taken to be as small a volume as possible since this material is, in general, a waste product from the refining operation and it has little utility other than as fuel. Conduit 56 is provided with a flow controller 58 which is normally set to regulate flow of bottoms liquid returned to the tower through conduit 56. This flow through conduit 56 is regulated in response to a level controller 59 which operates a reducing relay 60 similar to relay 16 of FIGURE 1. This reducing relay 60 feeds its signal of less intensity to a bias relay 92 similar to bias relay 29 of FIGURE 1. A signal of increased intensity is fed from bias relay 92 to adjust the set point of flow controller 58. This level controller 59, reducing relay 60, bias relay 92 and flow controller 58 operate in exactly the same manner as the corresponding apparatus parts described hereinabove relative to FIGURE 1. Thus the level of liquid in the bottom of column 52, when too low, is not increased to too high a level or when a little too high is not lowered to too great an extent.

If the level of liquid in the bottom of the tower starts to rise, less cooling or relatively more heating of the tower is needed. To accomplish this, less material is cooled and returned as reflux to the feed zone. With less material passing through the cooler (and less heat is being removed from the tower), less vapor is condensed, and the level in the bottom decreases, as desired.

For a small upset condition such as a reduced vapor feed rate to the column of FIGURE 2, the bottoms level begins to drop. The bottoms level controller 59 will reset the set point of the flow controller 58 by way of the reducing relay 60 and bias relay 92 to increase the flow of bottoms material through exchanger 90. The heavy cycle oil tray level will begin to drop and level controller 71 will reset the set point of the flow controller 74 by way of the reducing relay 72 and the bias relay 93 to reduce the heavy cycle oil flow through conduit 73. The light cycle oil yield through conduit 85 will usually be reduced either manually or by a liquid level control apparatus, not shown, and responsive to liquid level on the light cycle oil take-off tray 90. This liquid level control apparatus will override the normal set point of the flow controller 88 and in turn is overridden by the snap-acting relay 89. In this latter overriding, when the heavy cycle oil tray level drops to a predetermined low level, as herein disclosed, the snap-acting relay overrides any setting of the flow controller 88 and closes the valve of the controller 88.

For a small increase in vapor feed rate to the column of FIGURE 2, the operation is just the reverse of that explained in the immediately preceding paragraph.

In other words, the position of the level of liquid in column 12 is not over corrected. The column 52 is provided with vapor-liquid contact promoting apparatus, such as bubble cap trays, similar to that provided for column 12 of FIGURE 1. In column 52 these vapor-liquid contacting trays are identified by reference numeral 61. A heavy cycle oil take-off tray is provided with a well 70 for maintaining a substantial level of the heavy cycle oil for take-off purposes to be controlled by level controller 71. Level controller 71 feeds its output signal to a reducing relay 72 which, in turn, feeds a signal of reduced intensity to a bias relay 93 which then feeds a signal of increased intensity to reset the set point of flow controller 74. The heavy cycle oil is withdrawn from well 70 through a conduit 73, the rate of flow of which is regulated by the throttle valve in co-operation with action of the flow controller 74. This combination of apparatus parts, that is, level controller 71, reducing relay 72, bias relay 93 and flow controller 74 operates in exactly the same manner as the corresponding pieces of equipment operate as described relative to FIGURE 1. Thus, in this manner withdrawal of the heavy cycle oil in response to liquid level in well 70 is not over corrected.

A light cycle oil is removed from a well 90a at an upper level in the tower 52 and this light cycle oil in this particular case is withdrawn through a conduit 75 and passed into a treating step which, in this case, is illustrated as a stripper 76, and a dryer 81. The oil enters stripper 76 through conduit 75 and leaves the stripper through a conduit 79 and in case the oil is to be dried a valve 83 is closed and the oil then passes through a conduit 80 and through the dryer 81 and thence through conduit 86 provided with a heat exchanger 84 for reduction of temperature. This conduit 86 is provided with a flow controller apparatus 87 which is set to pass the light cycle oil to a subsequent processing step, not shown, at any desired and predetermined rate. If, however, it is desired not to remove any of the oil through conduit 86, the flow controller is set by adjusting its set point to zero flow and the motor valve in conjunction therewith fully closes. However, ordinarily, some predetermined flow is passed through the motor valve in conjunction with flow controller 87 to subsequent processing as desired.

In many instances, and for the purpose of this invention, a portion of the oil from stripper 76 or from dryer 81 is cooled in cooler 84 and a portion of the cooled oil is passed though a conduit 85 as a light cycle oil make product of the operation. The rate of removal of this make product is regulated by operation of the flow controller apparatus 88. Apparatus part 89 is ordinarily a snap-acting relay which is operated in response to the signal emitted from a level controller 71 and this snap-acting relay either is open or is closed, depending upon the signal emitted from the level controller.

The operation of this portion of the apparatus makes certain that there is always liquid reflux flowing downward from the heavy cycle oil well 70 so that the tower will never be dry of liquid in this portion. When the oil withdrawn from well 70 through conduit 73 reaches a predetermined low level, which is becoming so low that there is very little overflow from the well for refluxing the lower portion of the column, the level controller 71 emits a signal which is reduced in intensity in reducing relay 72 and its signal is then increased in bias relay 93 for adjusting the set point of flow controller 74 for throttling the valve in conjunction therewith. In this manner the withdrawal of the heavy cycle oil is reduced slightly in volume in order to increase the volume of heavy cycle oil in well 70, that is, to increase its level to such a position that there is ample overflow therefrom for properly refluxing the lower portion of the tower. This operation prevents over correction of the system. When the level on tray 70 falls to too low a level, the signal from level controller 71 also actuates snap-acting relay 89. This relay, upon actuation, resets the set point of flow controller 88 so as to close the motor valve in combination therewith thereby closing off the make light cycle oil normally flowing through conduit 85. Any oil passing through conduit 86 to said subsequent processing still flows through conduit 86. However, by actuation of the flow controller 88 to close off oil flow through conduit 85, there is reduction of the rate of withdrawal of the light cycle oil from well 90a through conduit 75 thereby causing greater than normal overflow from the tray to which well 90a is attached. Thus, this increased overflow then increases the flow of liquid reflux down the tower from said tray until it reaches the tray with which well 70 communicates. Thus, the level of the oil in well 70 is increased thereby increasing the rate of overflow therefrom for proper refluxing of the lower sections of tower 52. In this manner while level controller 71 by way of reducing relay 72, bias relay 93 and flow controller 74, is slow or phlegmatic, in correcting the rate of withdrawal of heavy cycle oil through conduit 73, when the level in well 70 is too low then its level is rapidly corrected by the signal from level controller 71 actuating snap-acting relay 89 to open or to close, to correct or change the setting of the set point of flow controller 88 to open or to close the motor valve actuated thereby.

The stripper vessel 76 is provided with a conduit 77 for inlet of stripping steam while a conduit 78 is provided for passage of said steam with stripped vapors back into the fractionating tower 52 at a point above the point of withdrawal of light cycle oil.

The top portion of tower 52 obviously is provided with conventional refluxing and make product withdrawal apparatus. Such apparatus involves a conduit 62 for withdrawal of overhead vapors, a reflux condenser 63 and a reflux accumulator 64. A pump 65 is provided for passage of condensate from accumulator 64, a portion of which condensate is passed through a conduit 66 for refluxing the tower, the flow in this conduit being controlled by a flow controller 67. The remainder of the condensate is passed through a conduit 68, the rate of flow of which is regulated by level controller apparatus 69.

The following data are specific operating conditions when using the apparatus of FIGURE 2 and are given merely as an example of the operation disclosed herein.

Vapor feed, b./h. (liquid barrels per hour) _____ 409
Overhead make, b./h. _____ 189
Light cycle oil to sponge, b./h. _____ 40
Light cycle oil yield, b./h. _____ 39
Heavy cycle oil yield, b./h. _____ 133
Bottoms yield, b./h. _____ 9
Recycle of cooled bottoms, b./h. _____ 230
Pressure on cooled bottoms recycle tray, p.s.i.g. ____ 7
Temperatures:
    Light cycle oil drawoff, ° F. _____ 427
    Heavy cycle oil drawoff, ° F. _____ 551
    Vapor feed, ° F. _____ 900
    Overhead from tower, ° F. _____ 260
    Bottom tower, ° F. _____ 650

While the bias relay was stated hereinabove as emitting a signal greater in intensity than the signal received by the relay by a definite amount was stated as being 10 p.s.i., obviously, this increase in pressure in these several bias relays 29, 92 and 93 can be set to increase the pressure by other values, for example, 5 p.s.i., 6 p.s.i., or any pressure suitable so that its output will actuate the set points of flow controllers.

The hereinbefore mentioned Moore M–F Model 66 relays, as relays 16, 60 and 72, are described in Bulletin 5011, page 12, Moore Products Co., Philadelphia, Pa., 1951, while bias relays, such as relays 29, 92 and 93 are described in Bulletin 681, Model No. 68–1, Figure 52, February 1950, of said Moore Products Co. Level controllers and flow rate controllers are conventional equipment and can be obtained from instrument supply houses. The installation and operation of such instruments are well understood by those skilled in the instrumentation art.

While the above flow diagrams have been described for illustrative purposes, the invention obviously is not limited thereto.

That which is claimed is:

1. An apparatus comprising, in operable combination, a fractional distillation vessel having at least a bottoms product outlet and a first means for providing reboiling heat, second means for sensing level of liquid in the reboiling section of said vessel, said second means emitting a first pneumatic signal indicative of said sensed liquid level, divider means communicating with said second means for receiving said first signal and reducing same by a 6:1 ratio, said divider means emitting a second signal less intense than and varying in proportion to said first signal, adder means communicating with said divider means for receiving said second signal and adding a constant value thereto, said adder means emitting a third signal of sufficient intensity to actuate control means but of the same intensity variance as said second signal, flow control means in communication with said bottoms product outlet and with said first means and in operable control communication with said flow control means for receiving said third signal and responding thereto.

2. An apparatus for providing reboiling heat to the kettle section of a fractional distillation column and for heating kettle product therefrom for subsequent processing comprising, in operable combination, a fractional distillation column having at least a bottoms product outlet and an inlet to the kettle section of said column for inlet of heated liquid providing reboiling heat, a liquid transfer means of predetermined capacity positioned operably in said bottoms product outlet, means communicating with said product outlet for heating same, said product outlet communicating with said inlet by way of said means for heating, first and second branch conduits communicating with said product outlet and with a point of disposal subsequently mentioned, first and second flow control means in said first and second branch conduits respectively, said first conduit being in operable communication with said means for heating, a liquid level sensing means positioned operably in said kettle section, said liquid level sensing means emitting a first signal indicative of said sensed liquid level divider means communicating with said level sensing means, for receiving said first signal and reducing same by a predetermined ratio, said divider means emitting a second signal less intense than and varying in proportion to said first signal, adder means communicating with said divider means for receiving said second signal and adding a constant value thereto, said adder means emitting a third signal of sufficient intensity to actuate a control means but of the same variance as said second signal, said adder means communicating with said first and second flow control means whereby upon sensing level of liquid said sensing means emits a first signal to said divider means and said divider means emits a second signal proportional to and less intense than said first signal to said adder means which emits a signal more intense than the signal emitted by said divider means but of the same intensity variance as the signal emitted by said divider means, and said first and second flow controllers function respectively in response to the signal emitted by said adder means thereby manipulating the flow of reboiling liquid through said inlet to said column.

3. An apparatus for regulating downflow of liquid reflux in a fractional distillation column provided with at least a pair of side draws for removing side products comprising, in operable combination, a fractional distillation column having separate bottoms product and overhead vaporous product outlets, an inlet for inlet of hot vaporous feed at a level above but near the kettle section of the column, a first fluid flow line communicating said bottoms product outlet with said column at a level above said feed inlet, said first fluid flow line being provided with a heat exchanger for providing cooling thereto, said column being provided with vapor-liquid contacting trays, a second fluid flow line communicating with one of said trays at a level above the level of said feed inlet for outlet of a first liquid side product, a liquid level sensing means communicating with the liquid containing space on a first of said trays emitting a first signal responsive to level of liquid on said tray, divider means communicating with said sensing means for receiving said first signal and reducing said first signal by a predetermined ratio and emitting a second signal proportionately less intense than said first signal emitted by said level sensing means, adder means communicating with said divider means for receiving said second signal and adding a constant value thereto and emitting a third signal of sufficient intensity to actuate a controller means but varying in intensity the same amount as the second signal, said adder means communicating operatively with a first flow control means in said second conduit whereby said third signal manipulates said first flow control means thereby controlling flow of liquid in said second conduit, a third fluid flow line communicating with a second tray in said column for withdrawal of a second product liquid, a second flow control means in said third fluid flow line, said liquid level sensing means also communicating operatively with said second flow control means and said second flow control means closing off flow of said second product liquid responsive to said third signal when it indicates a predetermined low level of liquid on said first tray as sensed by said level sensing means whereby upon closing off flow of said second product liquid reflux flow from said second tray on down said column is increased.

4. A method for the elimination of overcorrection of a liquid draw-off from the kettle section of a fractional distillation zone comprising introducing a hot, vaporous feed stock into said zone at a low level therein, withdrawing a stream of hot bottoms liquid from the kettle section thereof, dividing said stream into two portions, withdrawing one portion from the operation as a product at a predetermined rate of flow, cooling the other portion and introducing this cooled portion into said zone at a level above the level of introduction of said hot, vaporous feed stock, sensing a change in level of liquid in said kettle section and producing a pneumatic signal indicative of the change in level, dividing said signal to reduce its intensity by a predetermined ratio, and then adding a constant value thereto to increase its intensity by a predetermined value to produce a signal of sufficient level for actuating a controller, and regulating the rate of flow of said cooled portion in response to the thus modified signal.

5. A method for the control of sidestream withdrawal from the fractional distillation operation comprising introducing a feed stock into a fractional distillation zone and therein fractionally distilling said feed stock, withdrawing a first sidestream liquid from the take-off tray in said zone, sensing the level of liquid of said take-off tray and emitting a pneumatic signal indicative of the sensed level, dividing said signal to reduce its intensity by a predetermined ratio, and then adding a constant value thereto to increase its intensity by a predetermined value to produce a signal of sufficient level to actuate a controller, and regulating the rate of withdrawal of said first sidestream in response to the thus modified signal, withdrawing a second sidestream from a level above said take-off tray at a predetermined flow rate, and terminating the withdrawal of said second sidestream liquid in response to said modified signal when said modified signal represents a predetermined low level of said first sidestream liquid on said take-off tray whereby at least a predetermined minimum level of liquid on said take-off tray is maintained for continued downflow of internal reflux in said zone below said take-off tray.

6. A method for the control of sidestream withdrawal from a fractional distillation operation comprising introducing a hot, vaporous feed stream to be distilled into a low level of a fractional distillation zone and therein fractionally distilling said feed stock, withdrawing a stream of hot bottoms liquid from said zone, removing a predetermined portion of said hot bottoms liquid from the operation as a product, cooling the remainder of the hot bottoms product and returning this cooled portion to said zone at a level above the level of introduction of said feed stream, sensing the level of hot bottoms liquid in said zone and emitting a first pneumatic signal indicative of the sensed level, dividing said first signal to reduce its intensity by a predetermined ratio and then adding a constant value thereto to increase its intensity by a predetermined value to modify said first signal to a sufficient intensity level to actuate a controller, and regulating the flow of said cooled portion of bottoms product in response to the thus modified signal, withdrawing a first sidestream liquid from a take-off tray at a level above the level of return of said cooled portion of bottoms product, sensing the level of said sidestream liquid remaining on said take-off tray and emitting a second pneumatic signal indicative of the sensed liquid level on said tray, dividing said second signal to reduce its intensity by a predetermined ratio, and then adding a constant value thereto to increase its intensity by a predetermined value to modify said second signal to a sufficient intensity level to actuate a controller, and regulating the rate of withdrawal of said first sidestream liquid in response to the thus modified second signal, withdrawing a second sidestream liquid at a predetermined rate at a level of said zone above the level of withdrawal of said first sidestream liquid, and terminating withdrawal of said second sidestream liquid in response to said modified second signal when said second signal represents a predetermined low level of first sidestream liquid on said take-off tray whereby at least a predetermined minimum level of liquid is maintained on said take-off tray thereby providing for at least a minimum downflow of liquid reflux in said zone from said take-off tray.

References Cited by the Examiner

UNITED STATES PATENTS

| 1,876,551 | 9/1932 | Barstow et al. | 62—37 X |
| 2,285,540 | 6/1942 | Stein et al. | 235—61 X |
| 2,409,871 | 10/1946 | Krogh | 235—61 X |
| 2,467,951 | 4/1949 | Whitley | 202—181 X |
| 2,755,813 | 7/1956 | Farrington | 137—86 |
| 2,774,367 | 12/1956 | Grogan | 137—86 |
| 2,776,670 | 1/1957 | Hunt | 137—86 |
| 2,842,311 | 7/1958 | Petrie | 235—151 |
| 2,851,048 | 9/1958 | Hutchinson | 137—86 |
| 2,990,437 | 6/1961 | Berger | 202—160 X |

FOREIGN PATENTS 536,537    5/1941    Great Britain.

OTHER REFERENCES

"Control Engineering," vol. I, No. I, September 1954 (pp. 58–63).

NORMAN YUDKOFF, *Primary Examiner.*

GEORGE D. MITCHELL, *Examiner.*

M. H. SILVERSTEIN, *Assistant Examiner.*